(12) United States Patent
Hossain et al.

(10) Patent No.: US 12,355,359 B2
(45) Date of Patent: Jul. 8, 2025

(54) SWITCH BASED ON LOAD CURRENT

(71) Applicant: Intel Corporation, Santa Clara, CA (US)

(72) Inventors: MD Altaf Hossain, Portland, OR (US); Ankireddy Nalamalpu, Portland, OR (US); Mahesh K. Kumashikar, Bangalore (IN); Dheeraj Subbareddy, Portland, OR (US); Atul Maheshwari, Portland, OR (US); Mahesh A. Iyer, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 604 days.

(21) Appl. No.: 17/559,498

(22) Filed: Dec. 22, 2021

(65) Prior Publication Data

US 2022/0115959 A1   Apr. 14, 2022

(51) Int. Cl.
*H02M 5/293* (2006.01)
*H02H 9/00* (2006.01)

(52) U.S. Cl.
CPC ............ *H02M 5/293* (2013.01); *H02H 9/001* (2013.01)

(58) Field of Classification Search
CPC ........ H02M 5/293; H02H 9/001; H02J 1/082; G06F 30/343
See application file for complete search history.

(56) References Cited

U.S. PATENT DOCUMENTS

| | | | |
|---|---|---|---|
| 10,833,679 B2 | 11/2020 | Clark et al. | |
| 2016/0049941 A1 | 2/2016 | How et al. | |
| 2017/0126005 A1* | 5/2017 | Elsayed | G06F 1/305 |
| 2018/0026640 A1* | 1/2018 | Shankar | H03K 19/177 326/44 |

* cited by examiner

*Primary Examiner* — Adolf D Berhane
*Assistant Examiner* — Afework S Demisse
(74) *Attorney, Agent, or Firm* — Fletcher Yoder, P.C.

(57) ABSTRACT

Systems or methods of the present disclosure may provide for operating a programmable fabric including multiple programmable elements organized into a number of power domains that utilize a common voltage within the respective power domains. A current sensor senses a current of the programmable fabric. When the sensed current has crossed a threshold, the programmable fabric changes the number of power domains.

20 Claims, 7 Drawing Sheets

SWITCH BASED ON LOAD CURRENT

BACKGROUND

This disclosure relates to a switch for the power management of an electronic device. Specifically, the switch operates based on a sensed current of an electronic device.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be noted that these statements are to be read in this light, and not as admissions of any kind.

Integrated circuits are found in numerous electronic devices, from handheld devices, computers, gaming systems, robotic devices, automobiles, FPGAs, and more. FPGAs, among other types of reconfigurable integrated circuits, may include multiple sectors. The sectors may be grouped into power domains that share a common voltage. For instance, one power domain may contain sectors that use one common voltage, while another power domain may contain sectors that use a different common voltage. However, the electronic devices utilizing multiple power domains may consume relatively high current from power management in some modes and relatively low current in other modes, leading to power inefficiencies.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B. Moreover, this disclosure describes various data structures, such as instructions for an instruction set architecture. These are described as having certain domains (e.g., fields) and corresponding numbers of bits. However, it should be understood that these domains and sizes in bits are meant as examples and are not intended to be exclusive. Indeed, the data structures (e.g., instructions) of this disclosure may take any suitable form.

Figure 1:
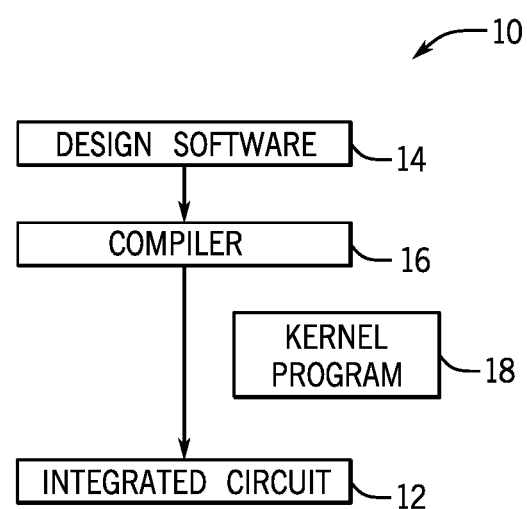
FIG. 1 is a block diagram of a process for programming an integrated circuit including a programmable fabric, in accordance with an embodiment.

An integrated circuit may utilize one or more programmable fabrics (e.g., FPGAs). With the foregoing in mind, FIG. 1 illustrates a block diagram of a system 10 used to configure a programmable device. A designer may implement functionality on an integrated circuit, such as an integrated circuit 12 that includes some reconfigurable circuitry, such as an FPGA. A designer may implement a circuit design to be programmed onto the integrated circuit 12 using design software 14, such as a version of Quartus by Altera™. The design software 14 may use a compiler 16 to generate a low-level circuit-design, which may be provided as a kernel program 18, sometimes known as a program object file or bitstream, that programs the integrated circuit 12. That is, the compiler 16 may provide machine-readable instructions representative of the circuit design to the integrated circuit 12.

Figure 2:
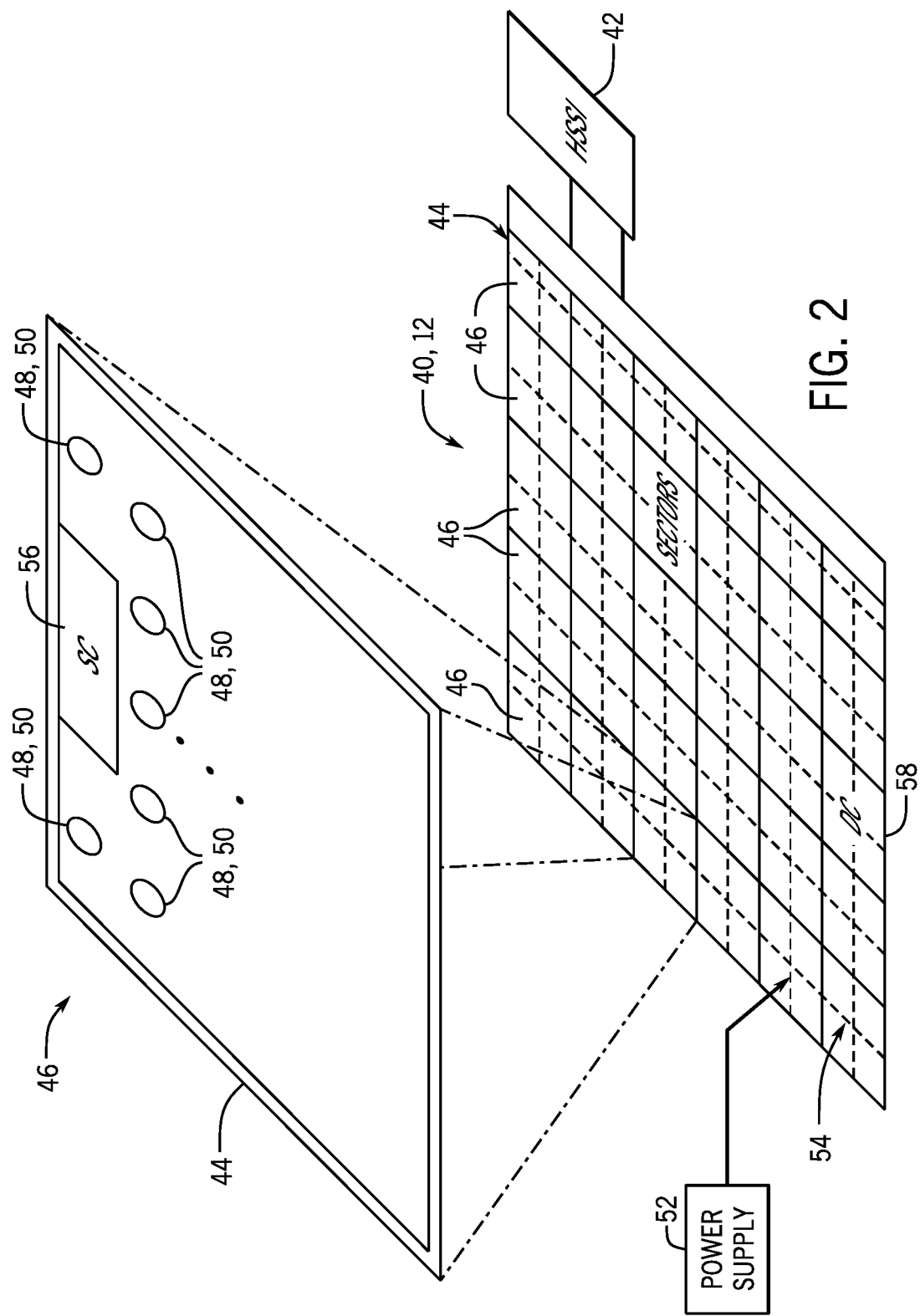
FIG. 2 is a diagram of the programmable fabric of FIG. 1, in accordance with an embodiment.

The integrated circuit 12 may include any programmable logic device, such as a field programmable gate array (FPGA) 40, as shown in FIG. 2. For the purposes of this example, the FPGA 40 is referred to as an FPGA, though it should be understood that the device may be any suitable type of programmable logic device (e.g., an application-specific integrated circuit, application-specific standard product, a CPU, or a GPU). In one example, the FPGA 40 is a sectorized FPGA of the type described in U.S. Patent Publication No. 2016/0049941, "Programmable Circuit Having Multiple Sectors," which is incorporated by reference in its entirety for all purposes. The FPGA 40 may be formed on a single plane. Additionally or alternatively, the FPGA 40 may be a three-dimensional FPGA having a base die and a fabric die of the type described in U.S. Pat. No. 10,833,679, "Multi-purpose Interface for Configuration Data and User Fabric Data," which is incorporated by reference in its entirety for all purposes.

In the example of FIG. 2, the FPGA 40 may include transceiver 42 that may include and/or use input-output circuitry for driving signals off the FPGA 40 and for receiving signals from other devices. Interconnection resources 44 may be used to route signals, such as clock or data signals, through the FPGA 40. The FPGA 40 of FIG. 2 is sectorized, meaning that programmable logic resources may be distributed through a number of discrete programmable logic sectors 46. Each programmable logic sector 46 may include a number of programmable logic elements 48 having operations defined by configuration memory 50 (e.g., configuration random access memory (CRAM)). The programmable logic elements 48 may include combinational or sequential logic circuitry. For example, the programmable logic elements 48 may include look-up tables, registers, multiplexers, routing wires, and so forth. A designer may program the programmable logic elements 48 to perform a variety of desired functions. A power supply 52 may provide a source of voltage and current to a power distribution network (PDN) 54 that distributes electrical power to the various components of the FPGA 40. Operating the circuitry of the FPGA 40 causes power to be drawn from the power distribution network 54.

There may be any suitable number of programmable logic sectors 46 on the FPGA 40. Indeed, while 29 programmable logic sectors 46 are shown here, it should be appreciated that more or fewer may appear in an actual implementation (e.g., in some cases, on the order of 50, 100, 500, 1000, 5000, 10,000, 50,000, or 100,000 sectors or more). Each programmable logic sector 46 may include a sector controller (SC) 56 that controls the operation of the programmable logic sector 46. Each sector controller 56 may be in communication with a device controller (DC) 58. Each sector controller 56 may accept commands and data from the device controller 58 and may read data from and write data into its configuration memory 50 based on control signals from the device controller 58. In addition to these operations, the sector controller 56 may be augmented with numerous additional capabilities. For example, such capabilities may include locally sequencing reads and writes to implement error detection and correction on the configuration memory 50 and sequencing test control signals to effect various test modes.

The sector controllers 56 and the device controller 58 may be implemented as state machines and/or processors. For example, each operation of the sector controllers 56 or the device controller 58 may be implemented as a separate routine in a memory containing a control program. This control program memory may be fixed in a read-only memory (ROM) or stored in a writable memory, such as random-access memory (RAM). The ROM may have a size larger than would be used to store only one copy of each routine. This may allow each routine to have multiple variants depending on "modes" the local controller may be placed into. When the control program memory is implemented as random access memory (RAM), the RAM may be written with new routines to implement new operations and functionality into the programmable logic sectors 46. This may provide usable extensibility in an efficient and easily understood way. This may be useful because new commands could bring about large amounts of local activity within the sector at the expense of only a small amount of communication between the device controller 58 and the sector controllers 56.

Each sector controller 56 thus may communicate with the device controller 58, which may coordinate the operations of the sector controllers 56 and convey commands initiated from outside the FPGA device 40. To support this communication, the interconnection resources 44 may act as a network between the device controller 58 and each sector controller 56. The interconnection resources may support a wide variety of signals between the device controller 58 and each sector controller 56. In one example, these signals may be transmitted as communication packets.

The FPGA 40 may be electrically programmed. With electrical programming arrangements, the programmable elements 48 may include one or more logic elements (wires, gates, registers, etc.). For example, during programming, configuration data is loaded into the configuration memory 50 using pins and input/output circuitry. In one example, the configuration memory 50 may be implemented as configuration random-access-memory (CRAM) cells. As discussed below, in some embodiments, the configuration data may be loaded into the FPGA 40 using an update to microcode of the processor in which the FPGA 40 is embedded. The use of configuration memory 50 based on RAM technology described herein is intended to be only one example. Moreover, configuration memory 50 may be distributed (e.g., as RAM cells) throughout the various programmable logic sectors 46 the FPGA 40. The configuration memory 50 may provide a corresponding static control output signal that controls the state of an associated programmable logic element 48 or programmable component of the interconnection resources 44. The output signals of the configuration memory 50 may be applied to the gates of metal-oxide-semiconductor (MOS) transistors that control the states of the programmable logic elements 48 or programmable components of the interconnection resources 44.

The sector controllers 56 and/or the device controller 58 may determine when each sector controller 56 performs a CRAM read operation on the configuration memory 50 of its programmable logic sector 46. Each time the sector controller 56 performs a CRAM read of the configuration memory 50, power is drawn from the power distribution network 54. If too much power is drawn from the power distribution network 54 at any one time, the voltage provided by the power distribution network 54 could drop to an unacceptably low level, or too much noise could arise on the power distribution network 54. To avoid this, the device controller 58 and/or the sector controllers 56 may structure CRAM reads of the programmable logic sectors 46 to avoid excessive instantaneous power consumption by temporally and/or spatially distributing the CRAM reads across different programmable logic sectors 46.

The sector controller 56 of the programmable logic sector 46 is shown to read and write to the configuration memory 50 by providing an ADDRESS signal to an address register and providing a memory write signal (WRITE), a memory read signal (RD DATA), and/or the data to be written (WR DATA) to a data register. These signals may be used to cause the data register to write data to or read data from a line of configuration memory 50 that has been activated along an address line, as provided by the ADDRESS signal applied to the address register. Memory read/write circuitry may be used to write data into the activated configuration memory 50 cells when the data register is writing data and may be used to sense and read data from the activated configuration memory 50 cells when the data register is reading data.

Figure 3:
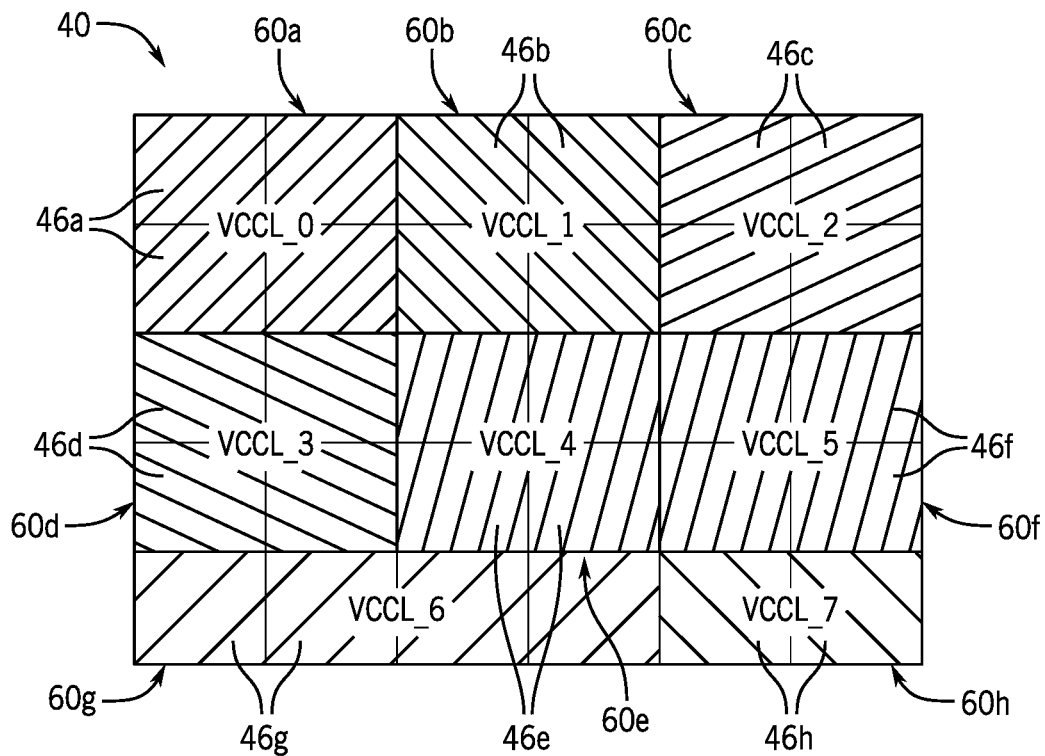
FIG. 3 is a diagram of power domains on an FPGA, in accordance with an embodiment of the present disclosure.

The programmable logic sectors 46 may be grouped into one or more power domains 60a, 60b, 60c, 60d, 60e, 60f, 60g and 60h (collectively referred to as 60a-h) that share a common voltage (e.g., VCC), as in FIG. 3. For example, the FPGA 40 may include a number of the power domains 60a-h. Although only the power domains 60a-h are described, there may be 1, 2, 4, 8, or any other suitable number of power domains included on the FPGA 40. One or more of the power domain 60a-h may be controlled individually to use a voltage that is common throughout the respective power domain 60a-h. For example, the power domain 60a may use a first voltage VCCL_0, the power domain 60b may use a second voltage VCCL_1, and so forth. Alternatively, some or all of the power domains 60a-h may share a similar voltage with each other. For example, both power domain 60a and 60b may use VCCL_0. Further, the power domains 60a-h may have similar or different current loads.

The FPGA 40 may be configurable to include the one or more power domains 60a-h using various supply voltages in the various power domains 60a-h. For example, in a first configuration, there may be one common voltage throughout the FPGA 40, such as VCCL_0. In such a case, all of the programmable logic sectors 46 would be configured to use VCCL_0. In other configurations, there may be 2, 4, 8, or any other suitable number of the power domains 60a-h, with any number of them sharing a common voltage (such as VCCL_0, for example), or with each having a voltage unique to that specific power domain 60a-h.

The programmable logic sectors 46 may be grouped into different power domains according to the voltage requirements of the individual programmable logic sectors 46. For example, the programmable logic sectors 46a may be configured to use VCCL_0, the programmable logic sectors 46b may be configured to use VCCL_1, and so forth. Indeed, there may be more programmable logic sectors, such as 46c, 46d, 46e, 46f, and 46g, which may be configured to use different voltages. Accordingly, the programmable logic sectors 46a may be grouped into the power domain 60a. The programmable logic sectors 46a may have a common voltage of VCCL_0. The programmable logic sectors 46b may be grouped together into the power domain 60b. The programmable logic sectors 46b may have a common voltage of VCCL_1. Other programmable logic sectors may be grouped to accommodate the common voltage used between the respective programmable logic sectors 46a-h.

Figure 4:
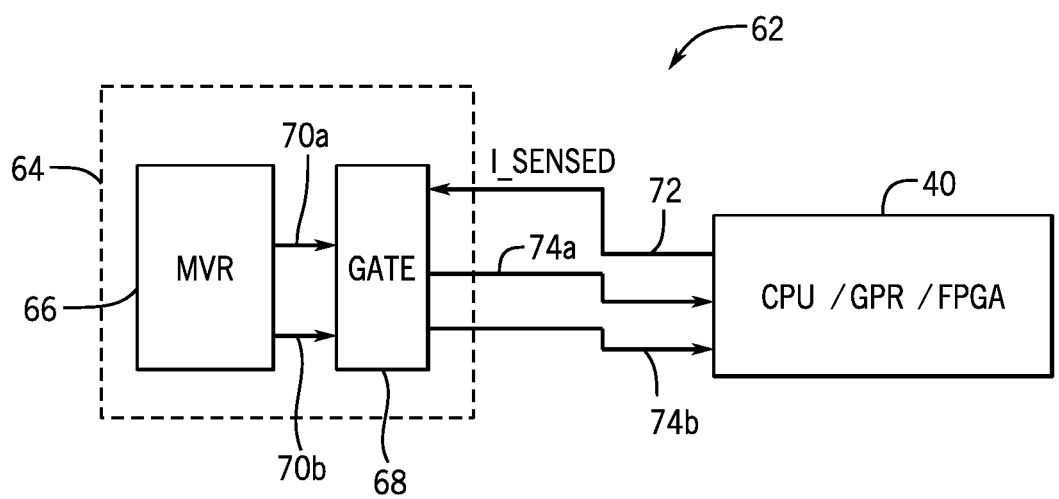
FIG. 4 is a diagram of a switch connected to an FPGA, in accordance with an embodiment of the present disclosure.

The FPGA 40 may be a part of a system 62 that allows the FPGA 40 to change the number of the power domains 60a-h that are in the FPGA 40, as shown in FIG. 4. For example, the system 62 may enable the FPGA 40 to switch from having 4 power domains (the power domains 60a-h) to 2 (the power domains 60a-b), to 1 (the power domain 60a), or to any other number of the power domains 60a-h, as will be discussed in greater detail below. It should be noted that the number of the power domains 60a-h on the FPGA 40 may either decrease or increase. When the number of power domains change, some of the programmable logic sectors 46 may shift between different power domains.

To accomplish this, the FPGA 40 may use a switch 64. Although a single switch 64 is discussed, the FPGA 40 may utilize one or more switches 64. The switch 64 may be implemented using an induction-based switch or any other suitable switch types. The switch 64 may, in some embodiments, include fully integrated voltage regulators (FIVRs) that are integrated into the FPGA 40. For example, the system 62 may be entirely integrated within the FPGA 40. Additionally or alternatively, the switch 64 may be separate from the FPGA 40, for example it may implement an external voltage regulator 66, such as an external motherboard voltage regulator (MVR) that is external to the FPGA 40 and part of the motherboard on which the FPGA 40 is mounted. Alternatively, the voltage regulator 66 may be any other type of external voltage regulator. In some embodiments, the switch 64 may be a combination of external voltage regulators and FIVRs.

The switch 64 may also include a power gate 68. The voltage regulator 66 (or FIVR) may be connected to the power gate 68 to send different voltages to the power gate 68, for example through channels 70a and 70b. In some embodiments, the channels 70a and 70b may share a common voltage, or they may have different voltages. Although the illustrated embodiment of the system 62 shows the two channels 70a and 70b, it should be noted that there may be more or fewer channels, depending on how many of the power domains 60a-h are available to the FPGA 40. In some embodiments, there may be one channel (70a, 70b, etc.) connected to the power gate 68 for each voltage that may be used by any power domain on the FPGA 40. Further, although the FIG. 4 shows the power gate 68 as being separate from and connected to the voltage regulator 66, in some embodiments the power gate 68 may be integrated into the voltage regulator 66. Further, in some embodiments the power gate 68 may be integrated into FIVRs integrated into the FPGA 40. Additionally or alternatively, the power gate 68 may be at least partially implemented in the FPGA 40.

The switch 64 may be connected to the FPGA 40 through a series of connections, for example connections 72, 74a, and 74b. The connection 72 may carry one or more current sense indicators, which may measure the overall current of the FPGA 40. The FPGA 40 and/or the switch 64 may use this sensed current to determine whether the number of the power domains 60a-h on FPGA 40 is appropriate or if a change should be made by adding more or removing some of the power domains 60a-h to or from the FPGA 40. Additionally or alternatively, in some embodiments, the current sense indicated in the connection 72 may include current sensing for any and/or all currents of any of the voltages provided to any of the power domains 60a-h on the FPGA 40. To perform this sensing, current sensing circuitry could be applied to measure the current of every available power domain 60a-h on the FPGA 40 and/or the total current to the FPGA 40. It should be noted that although FIG. 4 shows the connection 72 carrying the current sense going from the FPGA 40 to the external switch 64, the current may be sensed locally within the FPGA 40 and sent to FIVRs and/or gating integrated into the FPGA 40, to the external switch 64, or to a combination of the two.

Further, although the illustrated embodiment of the system 62 shows two connections (74a and 74b) between the power gate 68 and the FPGA 40, there may me any number of connections. For example, there may be a 1:1 ratio between the connections (74a and 74b, for example) from the power gate 68 to the FPGA 40 and the maximum number of the power domains 60a-h on the FPGA 40. The switch 64 may use the connections 74a, 74b to send respective voltages from the switch 64 to one or more of the power domains 60a-h on the FPGA 40. For example, the connection 70a may relay a voltage VCCL_0 to the power gate 68, and the connection 70b may relay a voltage VCCL_1 to the power gate 68. The power gate 68 may then, based on the sensed current, relay voltage VCCL_0 from the switch 64 to the power domain 60a via the connection 74a. The power gate 68 may also, based on a respective sensed current, relay and voltage VCCL_1 to the power domain 60b via the connection 74b.

Additional connections may exist to accommodate a different number of the power domains 60a-h on the FPGA 40, any number of which may relay a voltage to one or more of the power domains 60a-h. In some embodiments, the connection 70a and the connection 74a may relay a voltage that may be sent to more than one of the power domain 60a-h. For example, the power domains 60a and 60b may both use a common voltage VCCL_2. In that case, the connection 70a from the voltage regulator 66 to the power gate 68 and the connection 74a from the power gate 68 to the FPGA 40 may relay a voltage VCCL_2 from the switch 64 to both of the power domains 60a and 60b.

Figure 5:
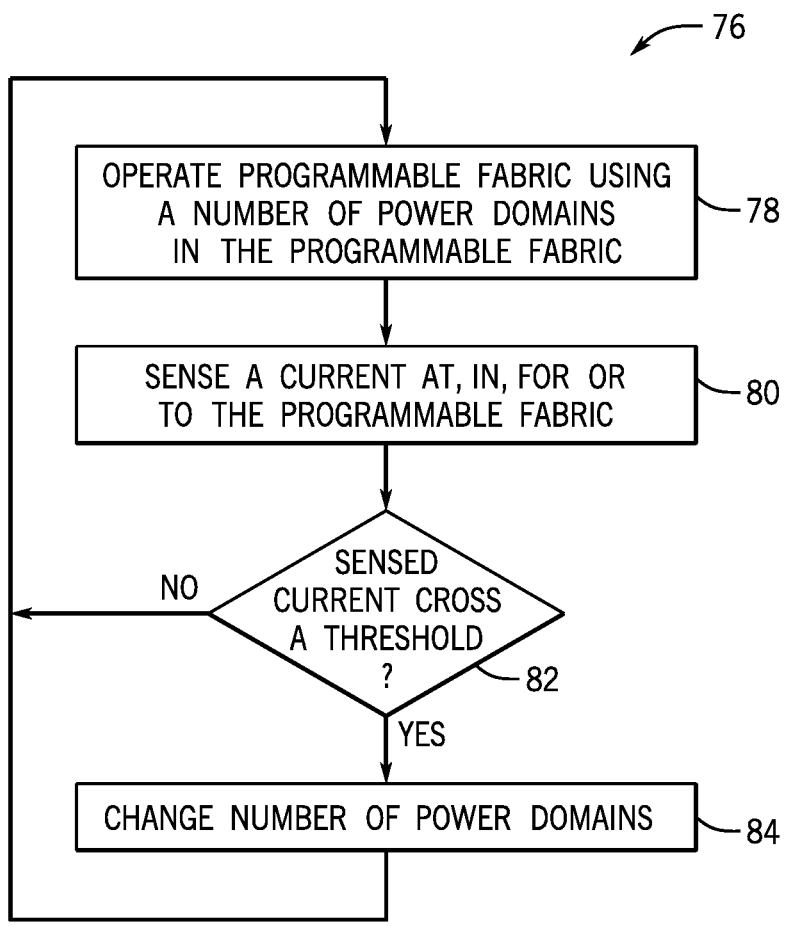
FIG. 5 is a flowchart of several operations of a switch and FPGA, in accordance with an embodiment of the present disclosure.

FIG. 5 includes a flowchart 76 that describes an example embodiment of operations of the system 62. The FPGA 40 may operate using a number of the power domains 60a-h in the FPGA 40 (block 78). For example, in an embodiment, the FPGA 40 may operate with a single power domain 60a. In some embodiments, there may be 2, 4, 8, or any other suitable number of the power domains 60a-h. In some instances, operating with more than one power domain may enable the FPGA 40 to be more efficient. The design software 14 may determine that certain groups of the programmable logic sectors 46 may use a specific voltage. For example, to maximize efficiency, the design software 14 may configure the FPGA 40 to include the power domain 60a that may use a VCCL_0 voltage and the power domain 60b that may use a VCCL_1 voltage and so on. It should be understood that this example is not intended to be comprehensive, as additional programmable logic sectors 46 may use other voltages, and the FPGA 40 may be configured to include additional power domains 60a-h to accommodate for them. However, in some embodiments, there may be a worst-case scenario in which one or more of the programmable logic sectors 46 may require more power from the power distribution network (PDN) 54 than it is able to provide. For example, in some embodiments, the power requirement may be 4-5 times more than what the PDN 54 is able to provide due to the use of multiple domains. In such cases, it would be advantageous to reduce the number of the power domains 60a-h on the FPGA 40 to allow the worst-case scenario to be handled. Accordingly, the FPGA 40 and/or the switch 62 may sense a current at, in, or for the FPGA 40 (block 80). In some embodiments, the current may be sensed from within the FPGA 40, for example by a current sensor that is integrated into the FPGA 40 or FIVR. Additionally or alternatively, in some embodiments the current may be sensed by the switch 64 using the power gate 68 and/or the voltage regulator 66. The sensed current may be a single signal indicating the overall current load on the FPGA 40. Additionally or alternatively, the sensed current may be the current of a voltage supplied for a specific one or the power domains 60a-h on the FPGA 40. In some embodiments, in addition to or alternative to the overall current draw of the FPGA 40, the current of each supplied voltage may be measured.

The switch 64 and/or the FPGA 40 may determine whether the sensed current crosses a threshold (block 82). For example, the switch 64 may be pre-configured with one or more threshold values, wherein there may be a threshold current associated with a number of the power domains 60a-h that may be configured for the FPGA 40. If the current from the entire current draw of the FPGA 40 or from one or more of the respective power domains 60a-h does not cross a threshold, the FPGA 40 may maintain operation using the configured number of the power domains 60a-h. However, if the current crosses a threshold, the switch 64 and the FPGA 40 may change the number of power domains delivered to and utilized by the FPGA 40 (block 84). The threshold may correspond to an increase or decrease in the number of the power domains 60a-h utilized in the FPGA. For instance, when a threshold is crossed due to an increase in sensed current across the threshold, the crossed threshold may correspond to an increase in the number of the power domains 60a-h utilized in the FPGA (e.g., 2). However, when the threshold is crossed due to a decrease in the current, the crossed threshold may correspond to a decrease in the number of the power domains 60a-h utilized in the FPGA to a specific number (e.g., 4). Multiple thresholds may correspond to different numbers of power domains. For example, a second, third, fourth, and other number of thresholds may further indicate that two, three, four, and other amounts of the power domains 60a-h may be on the FPGA 40. Furthermore, the amount of current for each threshold may be different depending on whether the current is increasing or decreasing.

Further, an increase or decrease in the number of power domains 60a-h utilized in the FPGA may trigger a change in the number of voltages being supplied by the voltage regulator 66 to the power gate 68. For instance, if the power domains 60a-h change from using two voltages (e.g., VCCL_0 and VCCL_1) to one voltage (e.g., VCCL_0), the voltage regulator 66 may stop supplying any extraneous voltages (e.g., VCCL_1). The change in the number of voltage domains change which voltages are output from the voltage regulator 66. For instance, the voltages used may take advantage of efficiencies in the voltage regulator 66 to provide. For example, the number of unnecessary or extraneous voltages being supplied to the power gate 68 may be reduced or eliminated to reduce the overall power consumption of the voltage regulator 66. Furthermore, certain voltage regulators may have different efficiencies for different output voltages using an input voltage. When using such voltage regulators, the efficiencies of the voltage regulator 66 may be taken into account when changing the number of power domains. For example, the more efficient voltages for the voltage regulator 66 may be prioritized.

In some embodiments, the system 62 may have precompiled configurations for different power domain voltages for the switch 64 to power newly added/removed power domains 60a-h. For example, in some embodiments the system 62 may store configurations to use voltages such as VCCL_0, VCCL_1, VCCL_2, and so forth in the configuration memory 50 of the FPGA 40. The number of voltages precompiled for use in the configurations may encompass all possible voltages that the programmable logic sectors 46 in the power domain 60a-h may be configured to use. These precompiled power domain voltages may be compiled by Quartus, or by any other suitable programmable logic device design software. Further, due to precompilation of the configurations to incorporate the voltages, these voltages may be readily available for the switch 64 to use to supply power to the power domains 60a-h.

In some embodiments, the system 62 may not precompile all possible power domain voltages. In some instances, precompiling configurations for a large number of voltages may be inefficient. In such cases, Quartus may generate configurations for a limited number of voltages in run-time in response to a threshold current being sensed. For instance, in cases where a threshold current that indicates that a power domain 60c is to be added to the FPGA 40, Quartus may generate a configuration for a voltage VCCL_3 that the switch 64 may then use to power the power domain 60c.

One or more of the power domains 60a-h may be removed from the FPGA 40, for instance, by collapsing them together with an adjacent power domain 60a-h. In some instances, this may be done by one of the power domains pulling power from a different bus/connection from the power gate 68 (e.g., the connection for an adjacent power domain). As an example, the power domain 60a may derive power from the connection 74a supplying a VCCL_0 voltage. After a threshold is crossed, the power domain 60a may switch to deriving power from the connection 74*b* supplying a VCCL_1 voltage to one or more of the power domains (e.g., power domain 60*b*). This switching effectively collapses two power domains together.

One or more of the power domains 60*a-h* may be added to the FPGA 40 by a new grouping of programmable sector(s) deriving power from another voltage bus/connection than it was previously using. For example, the switching may be completed using one or more multiplexer/demultiplexers.

Figure 6:
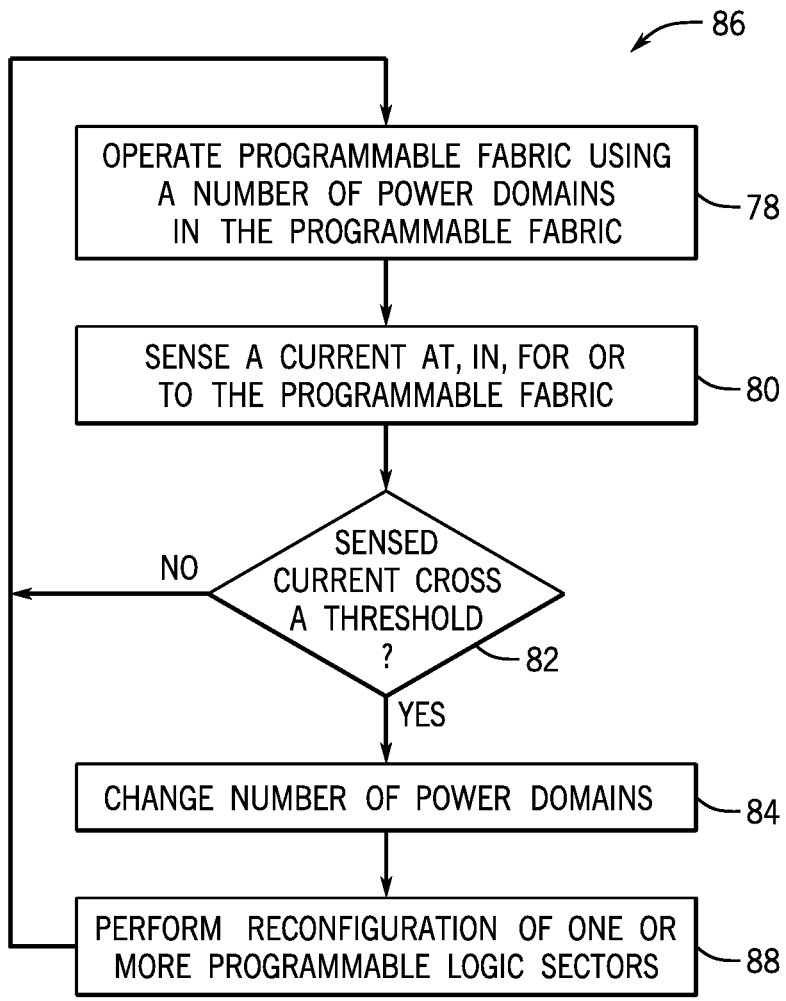
FIG. 6 is a flowchart of other operations of a switch and FPGA, in accordance with an embodiment of the present disclosure.

FIG. 6 describes additional features that may be utilized in the system 62. For example, after changing the number of the power domains 60*a-h* on the FPGA 40 (block 84), the system 62 may perform partial reconfiguration of one or more of the programmable logic sectors 46, or, in some embodiments, full reconfiguration of the FPGA 40 (block 88).

In some instances, when an existing power domain is collapsed into another power domain 0, the programmable logic sectors 46 that were previously using the voltage from the power domain 60*a* may experience performance losses without performing mitigation against such performance losses.

To recover some or all of the lost performance due to a voltage change in the configured logic elements in newly created and/or collapsed power domains, the programmable logic sectors 46*a* may be partially reconfigured (block 88). Partial reconfiguration may be done at run-time. In some instances, partial reconfiguration may be performed by loading a configuration from the configuration memory 50 that is designed for efficiency at a specific voltage that the programmable logic sectors 46*a* may utilize. This may be done, for example, through one or more of the sector controllers 56 of the programmable logic sectors 46*a*. Further, in some embodiments, it may be necessary or advantageous to perform a full reconfiguration of the FPGA 40 performed with a reset of the FPGA 40.

Figure 7:
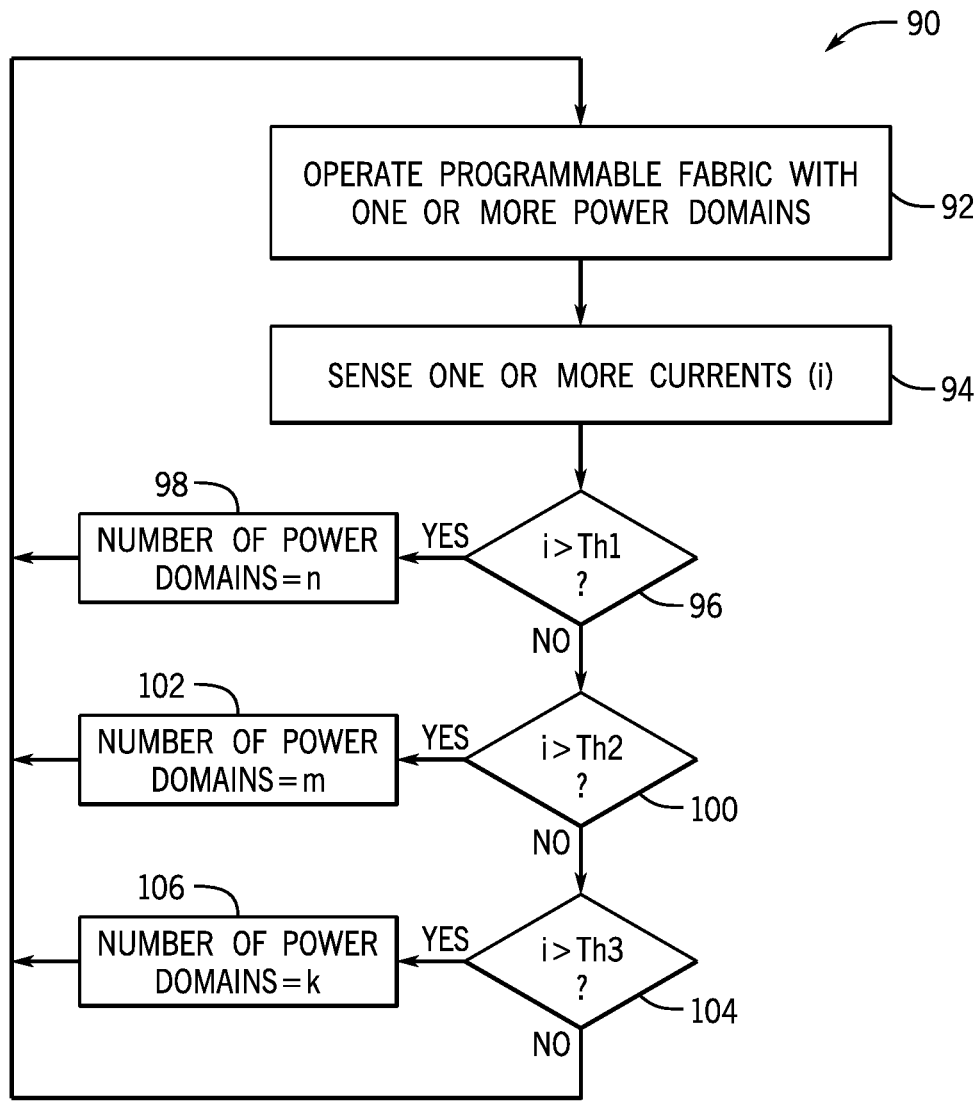
FIG. 7 is a flowchart of other operations of a switch and FPGA, in accordance with an embodiment of the present disclosure.

FIG. 7 describes further operations that may be utilized by the system 62. For instance, the system 62 may operate the FPGA 40 with one or more of the power domains 60*a-h* (block 92). Block 92 may match the description of block 78 described in relation to FIG. 5. The system 62 may sense one or more currents (block 94). Block 94 may match the description of block 80 in relation to FIG. 5.

Further, the system 62 may determine whether the sensed current(s) is greater than a first threshold (block 96). The first threshold may be associated with a first number of the power domains 60*a-h*. Additionally or alternatively, the first threshold may be associated with what voltages may be applied to one or more of the n power domains 60*a-h*. The programmable fabric organizes its sectors into n power domains n associated with the first threshold (block 98). This reorganization may trigger the partial reconfiguration of one or more of the programmable logic sectors 46 or the full reconfiguration of the FPGA 40, as described above.

If the current is not greater than the first threshold, the system 62 may then determine whether the sensed current(s) meets a second threshold (block 100). Similar to the first threshold, the second threshold may be associated with a second number (m) of the power domains 60*a-h*, where m is different from n. When the sensed current(s) is above the second threshold and below the first threshold, the system 62 may respond by changing the number of the power domains 60*a-h* to *m* power domains (block 102). This reorganization of power domains may also trigger the partial reconfiguration of one or more of the programmable logic sectors 46 impacted by the reorganization, or in some embodiments, the full reconfiguration of the FPGA 40.

The system 62 may then repeat the functions described in block 100, only this time using a third threshold associated with yet another number (k) of the power domains 60*a-h* (block 104). K is different number than n or m. Further, when the third threshold is met by the sensed current(s), blocks 98 and 102 may be repeated in block 106 with k power domains rather than n or m power domains. This reorganization of power domains may also trigger the partial reconfiguration of one or more of the programmable logic sectors 46 impacted by the reorganization, or in some embodiments, the full reconfiguration of the FPGA 40.

It should be noted that although only three possible thresholds have been described, any number of thresholds may be utilized. For example, there may be 1, 2, 3, 4, 5, or more thresholds, wherein any number of them may have unique requirements for the power domains 60*a-h* on the FPGA 40. Further, it should be noted that the system 62 may add or remove power domains 60*a-h*, depending on the sensed current(s). Furthermore, in some embodiments, different thresholds may be used for increases and decreases in current draw.

Figure 8:
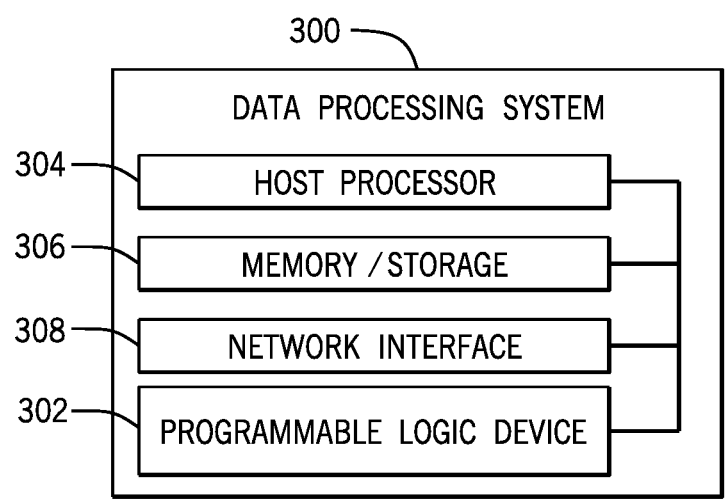
FIG. 8 is a block diagram of a data processing system including a processor with an integrated programmable fabric unit, in accordance with an embodiment of the present disclosure.

Bearing the foregoing in mind, a switch for switching voltage across portions of a programmable logic device, such as an FPGA, may be integrated into a data processing system or may be a component included in a data processing system, such as a data processing system 300, shown in FIG. 8. The data processing system 300 may include a host processor 304 (e.g., the processor 130), memory and/or storage circuitry 306, and a network interface 308. The data processing system 300 may include more or fewer components (e.g., electronic display, user interface structures, application specific integrated circuits (ASICs)). The host processor 304 may include any suitable processor, such as a central processing unit, a graphic processing unit, a controller, a microprocessor, and the like, that may manage a data processing request for the data processing system 300 (e.g., to perform encryption, decryption, machine learning, video processing, voice recognition, image recognition, data compression, database search ranking, bioinformatics, network security pattern identification, spatial navigation, cryptocurrency operations, or the like). The memory and/or storage circuitry 306 may include random access memory (RAM), read-only memory (ROM), one or more hard drives, flash memory, or the like. The memory and/or storage circuitry 306 may hold data to be processed by the data processing system 300. In some cases, the memory and/or storage circuitry 306 may also store configuration programs (bitstreams) for programming the programmable logic device 302. The network interface 308 may allow the data processing system 300 to communicate with other electronic devices. The data processing system 300 may include several different packages or may be contained within a single package on a single package substrate. For example, components of the data processing system 300 may be located on several different packages at one location (e.g., a data center) or multiple locations. For instance, components of the data processing system 300 may be located in separate geographic locations or areas, such as cities, states, or countries.

In one example, the data processing system 300 may be part of a data center that processes a variety of different requests. For instance, the data processing system 300 may receive a data processing request via the network interface 308 to perform encryption, decryption, machine learning, video processing, voice recognition, image recognition, data compression, database search ranking, bioinformatics, network security pattern identification, spatial navigation, digital signal processing, or some other specialized task.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . " it is intended that such elements are to be interpreted under 35 U.S.C. 112(f). However, for any claims containing elements designated in any other manner, it is intended that such elements are not to be interpreted under 35 U.S.C. 112(f).

Example Embodiments

EXAMPLE EMBODIMENT 1. A method comprising: operating a programmable fabric comprising a plurality of programmable elements organized into a number of power domains that utilize a common voltage within the respective power domains; sensing, with a current sensor, a current of the programmable fabric; determining whether the sensed current has crossed a threshold; and in response to determining that the current has crossed the threshold, changing the number of power domains in the programmable fabric.

EXAMPLE EMBODIMENT 2. The method of example embodiment 1, comprising in response to changing the number of power domains in the programmable fabric, performing a reconfiguration of at least one of the plurality of programmable logic sectors.

EXAMPLE EMBODIMENT 3. The method of example embodiment 2, wherein the reconfigured at least one of the plurality of programmable logic sectors is in a newly created power domain during the changing of the number of power domains.

EXAMPLE EMBODIMENT 4. The method of example embodiment 2, wherein the reconfigured at least one of the plurality of programmable logic sectors that was in a first power domain of the power domains prior to changing the number of power domains and is in a second power domain of the power domains after changing the number of power domains.

EXAMPLE EMBODIMENT 5. The method of example embodiment 1, wherein the current of the programmable fabric is an overall current of the programmable fabric.

EXAMPLE EMBODIMENT 6. The method of example embodiment 1, wherein the current of the programmable fabric is a specific current of one or more of the number of power domains but less than all of the power domains.

EXAMPLE EMBODIMENT 7. The method of example embodiment 1, wherein changing the number of power domains comprises changing the common voltage of one or more of the number of power domains to a common voltage of a different one or more of the number of power domains.

EXAMPLE EMBODIMENT 8. The method of example embodiment 1, wherein changing the number of power domains comprises changing the common voltage of one or more of the number of power domains to a new voltage that was not used in any of the power domains prior to changing the number of power domains.

EXAMPLE EMBODIMENT 9. A system comprising: a semiconductor device comprising one or more power domains; a switch coupled to the semiconductor device comprising: one or more voltage regulators that generate a plurality of voltage levels; and a power gate coupled to the one or more voltage regulators and that receives the plurality of voltage levels and selects which of the plurality of voltage levels is used for the one or more power domains in the semiconductor device; and a current sensor configured to measure a current of one or more of the plurality of voltage levels, wherein the switch is configured to change a number of voltage levels due to a change in the power domains on the semiconductor device.

EXAMPLE EMBODIMENT 10. The system of example embodiment 9, wherein the semiconductor device comprises a programmable logic device.

EXAMPLE EMBODIMENT 11. The system of example embodiment 10, wherein the semiconductor device changes the number of power domains based on the sensed current.

EXAMPLE EMBODIMENT 12. The system of example embodiment 11, wherein the programmable logic device comprises a plurality of programmable elements.

EXAMPLE EMBODIMENT 13. The system of example embodiment 12, wherein the programmable logic device changes the number of voltage levels by changing which of the voltage levels is used to power at least one programmable element of the plurality of programmable elements.

EXAMPLE EMBODIMENT 14. The system of example embodiment 13, wherein the programmable logic device performs a reconfiguration of the at least one programmable element based on a selected voltage level of the voltage levels utilized after changing the voltage levels.

EXAMPLE EMBODIMENT 15. The system of example embodiment 9, wherein the one or more voltage regulators generate fewer voltage levels after the change in the number of power domains with generated voltages selected to take advantage of efficiencies of the one or more voltage regulators.

EXAMPLE EMBODIMENT 16. The system of example embodiment 9, wherein configurations that use the plurality of voltage levels are precompiled before runtime.

EXAMPLE EMBODIMENT 17. The system of example embodiment 9, wherein the plurality of voltage levels are generated by the one or more voltage regulators based on the sensed current.

EXAMPLE EMBODIMENT 18. A system comprising: a semiconductor device comprising: one or more power domains; a switch comprising: one or more voltage regulators that generate a plurality of voltage levels; and a power gate coupled to the one or more voltage regulators and that receives the plurality of voltage levels and selects which of the plurality of voltage levels is used for the one or more power domains in the semiconductor device; and a current sensor configured to measure a current of one or more of the plurality of voltage levels, wherein the switch is configured to change a number of voltage levels due to a change in the power domains on the semiconductor device.

EXAMPLE EMBODIMENT 19. The system of example embodiment 18, wherein the semiconductor device changes the number of the one or more power domains based on the sensed current.

EXAMPLE EMBODIMENT 20. The system of example embodiment 18, comprising a programmable logic device, wherein the programmable logic device changes the number of voltage levels by changing which of the voltage levels is used to power at least one programmable element of the plurality of programmable elements.

What is claimed is:

1. A method comprising:
operating a programmable fabric comprising a plurality of programmable elements organized into a number of power domains that utilize a common voltage within the respective power domains;
sensing, with a current sensor, a current of the programmable fabric;
determining whether the sensed current has crossed a threshold; and
in response to determining that the sensed current has crossed the threshold, changing the number of power domains in the programmable fabric.

2. The method of claim 1, comprising in response to changing the number of power domains in the programmable fabric, performing a reconfiguration of at least one of the plurality of programmable elements.

3. The method of claim 2, wherein the reconfigured at least one of the plurality of programmable elements is in a newly created power domain during the changing of the number of power domains.

4. The method of claim 2, wherein the reconfigured at least one of the plurality of programmable elements that was in a first power domain of the power domains prior to changing the number of power domains and is in a second power domain of the power domains after changing the number of power domains.

5. The method of claim 1, wherein the current of the programmable fabric is an overall current of the programmable fabric.

6. The method of claim 1, wherein the current of the programmable fabric is a specific current of one or more of the number of power domains but less than all of the power domains.

7. The method of claim 1, wherein changing the number of power domains comprises changing the common voltage of one or more of the number of power domains to a common voltage of a different one or more of the number of power domains.

8. The method of claim 1, wherein changing the number of power domains comprises changing the common voltage of one or more of the number of power domains to a new voltage that was not used in any of the power domains prior to changing the number of power domains.

9. A system comprising:
a semiconductor device comprising one or more power domains;
a switch coupled to the semiconductor device comprising:
one or more voltage regulators that generate a plurality of voltage levels; and
a power gate coupled to the one or more voltage regulators and that receives the plurality of voltage levels and selects which of the plurality of voltage levels is used for the one or more power domains in the semiconductor device; and
a current sensor configured to measure a current of one or more of the plurality of voltage levels, wherein the switch is configured to change a number of voltage levels due to a change in the one or more power domains on the semiconductor device.

10. The system of claim 9, wherein the semiconductor device comprises a programmable logic device.

11. The system of claim 10, wherein the semiconductor device changes the number of power domains based on the sensed current.

12. The system of claim 11, wherein the programmable logic device comprises a plurality of programmable elements.

13. The system of claim 12, wherein the programmable logic device changes the number of voltage levels by changing which of the voltage levels is used to power at least one programmable element of the plurality of programmable elements.

14. The system of claim 13, wherein the programmable logic device performs a reconfiguration of the at least one programmable element based on a selected voltage level of the voltage levels utilized after changing the voltage levels.

15. The system of claim 9, wherein the one or more voltage regulators generate fewer voltage levels after the change in the number of power domains with generated voltages selected to take advantage of efficiencies of the one or more voltage regulators.

16. The system of claim 9, wherein configurations that use the plurality of voltage levels are precompiled before runtime.

17. The system of claim 9, wherein the plurality of voltage levels are generated by the one or more voltage regulators based on the sensed current.

18. A system comprising:
a semiconductor device comprising:
one or more power domains;
a switch comprising:
one or more voltage regulators that generate a plurality of voltage levels; and
a power gate coupled to the one or more voltage regulators and that receives the plurality of voltage levels and selects which of the plurality of voltage levels is used for the one or more power domains in the semiconductor device; and
a current sensor configured to measure a current of one or more of the plurality of voltage levels, wherein the switch is configured to change a number of voltage levels due to a change in the one or more power domains on the semiconductor device.

19. The system of claim 18, wherein the semiconductor device changes the number of the one or more power domains based on the sensed current.

20. The system of claim 18, comprising a programmable logic device, wherein the programmable logic device changes the number of voltage levels by changing which of the voltage levels is used to power at least one programmable element of the plurality of programmable elements.

* * * * *